United States Patent
Chaupin et al.

(10) Patent No.: US 10,808,872 B2
(45) Date of Patent: Oct. 20, 2020

(54) SECURE TUBE COUPLING WITH AUTOMATIC CONNECTION

(71) Applicant: A. RAYMOND ET CIE, Grenoble (FR)

(72) Inventors: Jérôme Chaupin, Saint Pierre d'Allevard (FR); Frédéric Poggi, Seyssinet-Pariset (FR)

(73) Assignee: A. RAYMOND ET CIE, Grenoble (FR)

( * ) Notice: Subject to any disclaimer, the term of this patent is extended or adjusted under 35 U.S.C. 154(b) by 531 days.

(21) Appl. No.: 15/342,573

(22) Filed: Nov. 3, 2016

(65) Prior Publication Data

US 2017/0146173 A1    May 25, 2017

(30) Foreign Application Priority Data

Nov. 20, 2015  (FR) ...................... 15 61186

(51) Int. Cl.
  *F16L 37/12*      (2006.01)
  *F16L 37/14*      (2006.01)
  *F16L 37/088*     (2006.01)

(52) U.S. Cl.
  CPC ....... *F16L 37/1225* (2013.01); *F16L 37/0885* (2019.08); *F16L 37/144* (2013.01); *F16L 2201/10* (2013.01)

(58) Field of Classification Search
  CPC .. F16L 37/1225; F16L 37/144; F16L 37/0885

(Continued)

(56) References Cited

U.S. PATENT DOCUMENTS 7,823,930 B2 * 11/2010 Feger .................... F16L 37/144
                                                                285/319
2005/0087981 A1 * 4/2005 Yamada .............. F16L 37/0982
                                                                285/81

(Continued)

FOREIGN PATENT DOCUMENTS

CN        204664684 U    9/2015
FR          2910109 A1   6/2008

(Continued)

OTHER PUBLICATIONS

French Search Report and Written Opinion dated Jul. 14, 2016.

(Continued)

*Primary Examiner* — David Bochna
*Assistant Examiner* — Fannie C Kee
(74) *Attorney, Agent, or Firm* — Dickinson Wright PLLC (57) ABSTRACT

A tube coupling including a female connector a body into which a male connector having an annular collar is inserted axially, and a connection element is provided. The connection element extends in a transverse direction within the body of the female connector. The connection element is designed to interfere mechanically with the collar during insertion of the male connector and to move transversely of its own accord towards the inside of the female connector. The connection element includes a locking hook that co-operates with a locking catch provided in the female connector. The hook goes past the catch as a result of the mechanical interference of the collar that drives axial and radial elastic deformation of the connection element. The hook locks against the catch when the connection element is fully pushed into the female connector.

9 Claims, 4 Drawing Sheets (58) Field of Classification Search
USPC .......................................... 285/305, 308, 319
See application file for complete search history.

(56) References Cited

U.S. PATENT DOCUMENTS

| | | | |
|---|---|---|---|
| 2005/0218650 A1* | 10/2005 | Pepe .................... | F16L 37/088 |
| | | | 285/308 |
| 2006/0103134 A1* | 5/2006 | Kerin ................... | F16L 37/088 |
| | | | 285/305 |
| 2008/0150280 A1 | 6/2008 | Feger et al. | |
| 2010/0052315 A1* | 3/2010 | Kerin ................... | F16L 37/144 |
| | | | 285/148.21 |
| 2011/0127766 A1* | 6/2011 | Tsurumi ............... | F16L 37/144 |
| | | | 285/305 |
| 2012/0326435 A1 | 12/2012 | Okazaki | |
| 2013/0082459 A1* | 4/2013 | Kaneko ................ | F16L 37/088 |
| | | | 285/93 |
| 2017/0067588 A1 | 3/2017 | Chaupin et al. | |

FOREIGN PATENT DOCUMENTS

| | | | |
|---|---|---|---|
| JP | 2010270867 A | 12/2010 | |
| WO | 2015177472 A1 | 11/2015 | |

OTHER PUBLICATIONS

Korean Office Action dated Sep. 5, 2018.
Office Action dated Jul. 30, 2019 corresponding to Indian Application No. 201614038609.

* cited by examiner

SECURE TUBE COUPLING WITH AUTOMATIC CONNECTION

This U.S. utility patent application claims the benefit of French patent application no. 1561186, filed Nov. 20, 2015, which is incorporated herein by reference for all purposes.

BACKGROUND

1. Technical Field

The present invention relates to the field of tube couplings for connecting together fluid pipes or hoses, e.g. fuel hoses for motor vehicles.

2. Related Art

Such a tube coupling for coupling fuel hoses is already known, in particular from patent documents WO 2015/177472 and US 2012/0326435.

In the known tube coupling of US 2012/0326435, the connection element constitutes a retaining element for blocking the male connector in position when it is fully pushed into the female connector, forming a lock that extends transversely in the female connector behind the collar of the male connector in such as a manner as to block it axially.

The connection or retaining element comprises two tines that are spaced apart from each other, like a kind of U-shaped fork, which tines extend in a transverse direction inside the female connector, each tine having a front face that interferes with the collar of the male connector.

The connection element is initially positioned in the female connector in a high, pre-assembly position in which the base of the U-shape projects outside the female connector and the two tines of the connection element extend substantially on either side of the male connector in front of its collar (considering that the front of the collar corresponds to the front face of the collar that is furthest downstream along the axis in the direction for inserting the male connector into the female connector).

When the male connector is pushed axially into the female connector, the front face of the collar of the male connector then interferes with front faces of the tines of the connection element, which faces are oblique relative to the axial direction and also relative to the transverse direction. This leads to the tines of the connection element being moved apart radially in elastic manner by reacting to the thrust force exerted axially against said oblique front faces, and leads to transverse movement of the connection element in the female connector by reaction to the thrust force exerted transversely against said oblique front faces. As they move apart radially and elastically, the elastic tines accumulate retraction energy. The maximum spacing of the elastic tines during the transverse movement of the connection element corresponds to the diameter of the collar.

During downward movement of the connection element in the female connector, the tines move apart over the collar until they reach the maximum spacing, i.e. diameter of the collar. Thereafter, once the diameter has gone past and because of the energy accumulated by the elastic spacing, the tines retract with a thrust force component that extends in the transverse direction, and the transverse movement of the connection element continues briefly towards the inside of the female connector.

This provides a coupling with automatic connection.

In that prior art tube coupling, the connection element also has a stationary frame extending transversely inside the female connector parallel to the tines of the connection element and having an elastic tongue at its base that extends in oblique manner relative to the axis of the female connector.

The tongue is arranged in such a manner that while the male connector is being pushed axially into the female connector, the male connector pushes the tongue so as to move it axially relative to its base. As a result, the elastic tongue is compressed and stores energy, and after the elastic tines of the connection element have gone past the diameter of the collar while the connection element is moving transversely, the tongue is released and produces a thrust force on the connection element that tends to urge it towards the inside of the female connector along the transverse direction.

The connection element is then in its low, retaining position in which it forms a lock preventing axial movement of the male connector in the female connector. In this low position, the connection element appears to be practically retracted into the female connector. The tongue then makes it possible to prolong the pushing of the connection element into the female connector after going past the diameter of the collar of the male connector while it is moving transversely.

That known tube coupling nevertheless presents several drawbacks.

Firstly, it requires a plurality of separate parts that interact with one another in order to retain or block the male connector in the female connector and move the connection element automatically towards the inside of the female connector.

Those various parts need to be mutually coordinated in dynamic and complex manner. They also increase the costs of fabricating the tube coupling. That tube coupling also presents a body with large amounts of perforation, thereby making it less robust.

Thereafter, the stroke of the connection element after it has gone past the collar, depends on the magnitude of the deformation of the tongue, and in practice its stroke is relatively small because the parts are miniaturized.

As a result, the spacing between the high, pre-assembly position and the low position of the connection element is small, and this difference is difficult to perceive, whether visually or by touch.

Furthermore, it is known that in existing tube couplings, when the connection element is in the low position in the female connector, the tines are subjected to mechanical stresses that persist, thereby leading to wear of the element, and in the event of the tube coupling being heated, damage by creep is also possible.

Finally, tube couplings need to be made safer, since it is known that by pulling axially on the male connector while removing the lock, it is possible to disconnect the male connector from the female connector.

SUMMARY

The object of the invention is thus to mitigate the above-mentioned drawbacks.

To this end, the invention provides a tube coupling comprising a female connector having a body defining an orifice into which a male connector having an annular collar is to be inserted along an axial direction, and a connection element that extends along a transverse direction in a recess in the body of the female connector and that is designed to be deformed elastically radially towards the outside of the female connector by mechanical interference with the collar during the insertion of the male connector into the female connector and, in reaction to the radial elastic deformation, to move of its own accord along the transverse direction towards the inside of the female connector, the connection element comprising at least one locking hook that cooperates with a locking catch provided in the body of the female connector, the hook closing on the catch in a locking position when the connection element is fully pushed into the body of the female connector, the coupling being characterized in that the connection element and said body of the female connector are designed so that, during the mechanical interference, the locking hook is initially projected axially into the body of the female connector before the connection element is deformed radially in such a manner that in reaction to the axial and elastic deformation of the connection element, the hook goes around the locking catch in order to reach the closure position on the locking catch.

The coupling may present the following features:

the connection element is in the form of two forks, with a first U-shaped fork forming a lock for the collar and a second U-shaped fork forming a yoke, the forks being connected together at the bases of the U-shapes, the second U-shaped fork having two branches, each provided with a locking hook having its opening facing radially;

in a partially pushed-in position of the connection element into the body of the female connector, the opening of each hook is located above a locking catch that forms an abutment for the connection element, and in the recess of the body of the female connector each catch is arranged in a clearance zone in which each hook moves axially and goes around the catch;

each hook of the connection element is provided with a retaining finger that prevents the connection element from moving transversely in the clearance zone inside the recess of the female connector;

the front interference face of each branch is formed by an oblique surface that slopes relative to the axial direction and that is arranged below the middle of the axial orifice of the female connector in order to interfere with the collar of the male connector;

each branch of the connection element has a back face opposite from the interference front face, which back face is provided with a peg whereby the connection element bears against the body of the female connector in order to force the branch to twist under the effect of the mechanical interference of the male connector against the connection element;

the connection element, when it is fully pushed into the recess of the female connector, is flush with the outside surface of the body of the female connector, and in this position it masks a visual indicator for verifying proper assembly that is applied to the connection element; and the coupling further comprises a clip designed to be inserted in the connection element when the connection element is fully inserted in the body of the female connector, the clip serving as an indicator for verifying that the coupling is properly assembled.

The idea is thus to transform effectively the energy that is released by the connection element on retracting elastically both radially and axially into a thrust force that is oriented and controlled in the transverse travel direction of the connection element towards the inside of the female connector, and to lock the connection element in secure manner to the female connector.

With the arrangement described herein, it is possible for the connection element to have a position difference between a high, pre-assembly position and a low, locking position that is large enough to constitute a reliable indicator that can be inspected visually or by touch in order to discover whether the male connector is fully coupled in the female connector.

Furthermore, the arrangement may be implemented in a female connector body that remains relatively closed (i.e. perforated little) thus making it possible to reduce the effects of contaminants, such as dust, becoming deposited inside the female connector and also increasing the robustness of the body.

Other characteristics, advantages, and details of the present invention appear on reading the following description of an embodiment of the invention given by way of non-limiting illustration, the description being made with reference to the drawings summarized below.

BRIEF DESCRIPTION OF THE DRAWINGS

The present invention can be better understood and other advantages appear on reading the following description and the accompanying drawings, in which.

DETAILED DESCRIPTION OF EXAMPLE EMBODIMENTS

Figure 1:
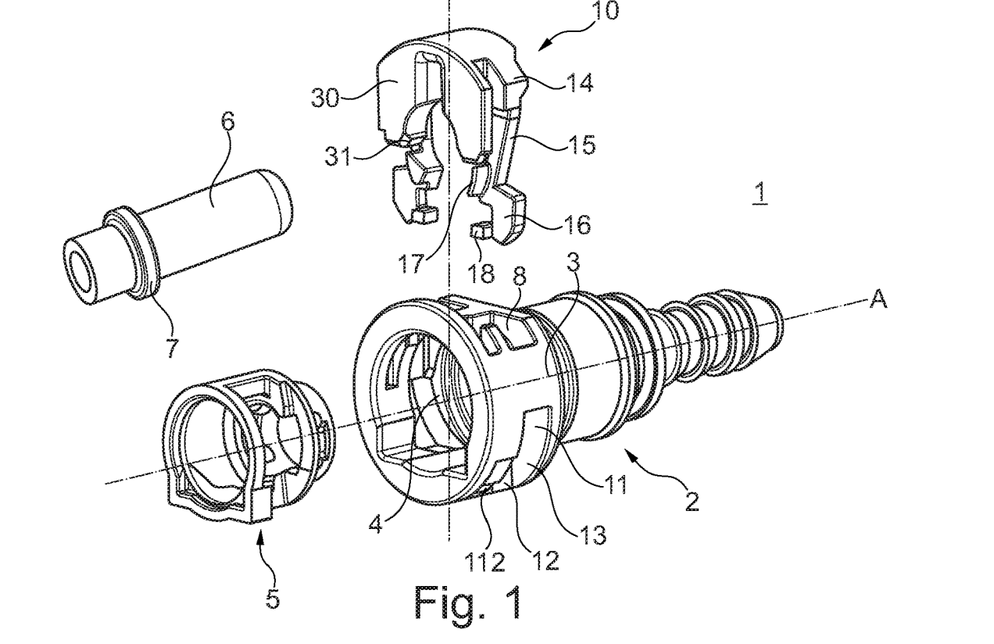
FIGS. 1 and 2 are two diagrammatic exploded views of the tube coupling comprising a female connector, a ring internal to the female connector, a connection element, and also showing a male connector in FIG. 1.
Figure 2:
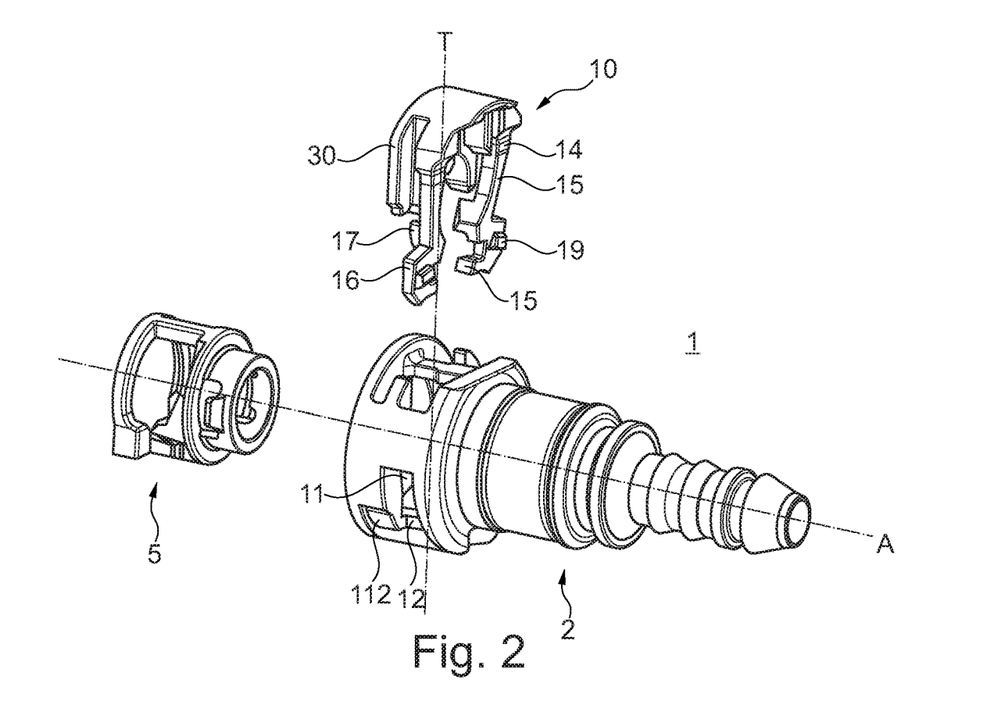

FIGS. 1 and 2 are exploded views of the various portions making up the tube coupling 1. The tube coupling 1 comprises a female tubular connection endpiece (female connector) 2 made up of two portions in this example, comprising a main body 3 of tubular shape that extends along an axial direction A and that is provided with an axial opening 4, and a ring 5 that is axially engageable in the opening 4 of the main body 3.

It should be understood that a female endpiece made integrally as a single part is also possible.

In the tube coupling 1, a male tubular connection endpiece (male connector) 6 is designed to be inserted axially in the female connector 2, specifically in the ring 5 in this example.

The male connector 6 is in the form of an elongate cylindrical tube and it presents an annular collar on its circular periphery, with the diameter of the annular collar 7 being slightly smaller than the inside diameter of the ring 5.

As can also be seen in FIG. 1, the body 3 of the female connector 2 presents a shaped inside recess 8 showing a radial opening in its top that forms a kind of slideway into which a connection element 10 can be inserted transversely and slide. In its portion situated below the middle of the axial opening 4, the inside recess 8 presents two clearance zones 11 arranged symmetrically in the form of radial slots provided in the annular peripheral surface of the female connector 2. These radial slots enable branches (described below) of the connection element 10 to splay apart radially inside the body of the female connector 2.

As can be seen in FIG. 2, in the bottom portion 3 of the female connector 2, the clearance zone 11 presents an axially-arranged locking catch 12 and an empty space 13 adjacent to the catch 12. Another catch 12 with an empty space 13 that are not visible in the figure are arranged in another clearance zone that is symmetrical to the clearance zone 11 that can be seen in FIG. 2.

The locking catch 12 may be rectangular in shape, however it may also be an oblique surface as shown that slopes relative to the transverse direction in which the connection element 10 is inserted and that acts as a ramp for the sliding of the connection element 10.

On its outer circumference, the body 3 of the female connector 2 has a shoulder 112 adjacent to each catch 12 and forming a stop for the connection element 10. In this example, the connection element 10 is in the form of two forks, a first fork of upside-down U-shape forming a lock 30, and a second fork of upside-down U-shape forming a yoke 14. The two forks are connected together via the bases of the U-shape.

The first fork forming the lock 30 is designed to be placed behind the collar 7 of the male connector 6 so as to hold it and block it in the axial direction when the male connector 6 is fully pushed into the inside of the female connector 2. The lock 30 has two branches spaced apart from each other and extending in the transverse insertion direction. The branches of the lock 30 are shaped so as to present a radius of curvature corresponding to the diameter of the cylindrical tube of the male connector 6. Each of the ends of the branches of the lock 30 presents a chamfer 31 extending axially and sloping towards the outside of the lock 30. The end of each branch of the lock 30 in the vicinity of the chamfer 31 does not go beyond the middle of the axial opening 4 in the female connector 2.

The second fork presents two flexible branches 15 that are spaced apart from each other and that extend in the transverse insertion direction. The two branches 15 are shaped to form kinds of beams that slide in the slots of the slideway defined by the radial recess 8. Each flexible branch 15 presents a C-shaped locking hook 16 at its free end, with the open side of the C-shape facing radially towards the inside of the orifice in the body 3 of the female connector 2. These two C-shapes face each other. More particularly, the end of each branch 15 is constituted by the base of the C-shape of the hook 16.

Each flexible branch 15 of the connection element 10 presents a front face that faces the collar 7 of the male connector 6 when it is engaged in the female connector 2, and referred to as the front face for interference with the collar 7.

In its portion situated beneath the middle of the axial opening 4 in the female connector 2, the front face of each branch 15 includes an oblique surface or feeler 17 that slopes relative to the axial insertion direction of the male connector 6, that faces towards the inside of the orifice 4 of the female connector 2, and that when the connection element 10 is in a high, pre-assembly position inside the female connector 2 serves to interfere with the front face of the collar 7 of the male connector 6 when it is pushed into the female connector 2.

Beside its front face, each of the hooks presents a retaining finger 18 or lug on the base of its C-shape that projects axially from the front face for a function that is explained below. The total thickness of the hook 16 and of the retaining finger 18 in the axial direction A is greater than the empty space 13 adjacent to the catch 12.

In a particular embodiment, a peg 19 projects axially from the back face of each flexible branch 15 of the connection element 10 from the middle portion of the C-shape of the hook 16, as can be seen in FIG. 2. The function of the pegs 19 is explained below.

As explained below, the flexible branches 15 of the connection element 10 are arranged so that the connection element 10 moves of its own accord towards the inside of the female connector 2 in the transverse direction T as a result of a thrust force that is produced by reaction to elastic deformation of the flexible branches 15 acting axially and then radially, as occurs when pushing the male connector 6 into the female connector 2.

Figure 3A:
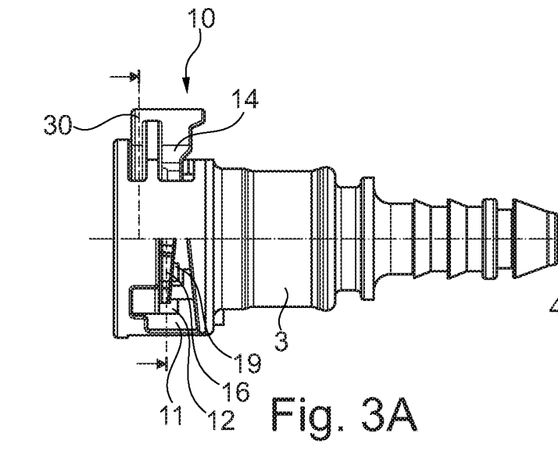
FIGS. 3A and 3B are respectively a profile view and an end view in two different cross-sections showing the tube coupling in a pre-assembly position.
Figure 3B:
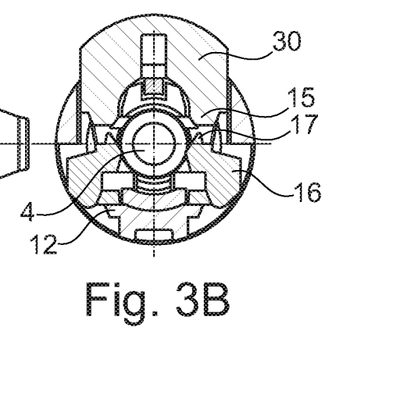

In FIGS. 3A and 3B, the connection element 10 is in a high, pre-assembly position in the female connector 2. In the high, pre-assembly position of the connection element 10, the top of the connection element 10 projects from the top outside surface of the female connector 2 sufficiently, e.g. by about 3 millimeters (mm) to 4 mm, to enable an operator to distinguish reliably by visual or tactile inspection between the high, pre-assembly position of the connection element 10 and a low, locking position of the connection element 10 in the female connector 2.

In this high, pre-assembly position, the flexible branches 15 are in a rest position, with the opening in each hook 16 of the connection element 10 being located above the corresponding locking catch 12 in the body 3 of the female connector 2, which catches constitute an abutment for the connection element 10. Thus, the connection element 10 cannot be inserted transversely by accident.

The sequence of movements made by the connection element 10 of its own accord in the female connector 2 is described below with reference to FIGS. 4 to 8.

Figures 4A, 4C:
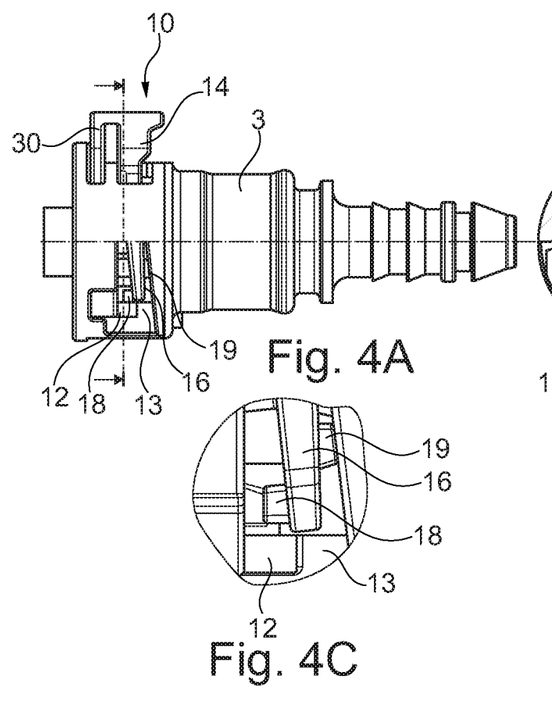
FIGS. 4A and 4B are respectively a profile view and an end view in cross-section of the tube coupling in a first state of mechanical interference with the male connector.
FIG. 4C is an enlargement of a portion of FIG. 4A.
Figure 4B:
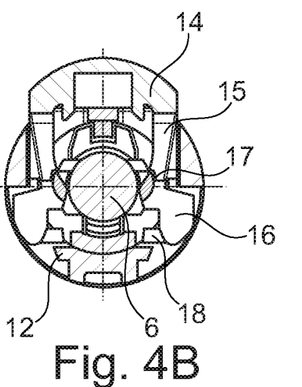

In FIGS. 4A, 4B, and 4C, the male connector 6 is partially inserted into the female connector 2.

The top periphery of the collar 7 of the male connector comes into contact with the branches of the lock 30 of the connection element 10 via the chamfers 31. By pushing the male connector 6 axially into the orifice of the female connector 2, the collar 7 exerts mechanical interference with pressure in the axial direction against the feelers 17 of the flexible branches 15 of the connection element 10. This axial thrust causes the flexible branches 15 to move axially but does not cause the branches 15 to move apart radially because the retaining fingers 18 on the front faces of the hooks 16 are still in abutment against the locking catches 12 of the body 3 of the female connector 2 and they prevent the connection element 10 from passing transversely into the clearance zones 11 inside the recess 8 of the female connector 2.

The maximum axial movement of the branches 15 is obtained when the back faces of the flexible branches 15 are axially in abutment against the inside of the body 3 of the female connector 2. In a particular embodiment in which bearing pegs 19 are arranged on the back faces of the branches 15, the maximum axial movement is obtained when the pegs 19 come into abutment against the inside of the body 3 of the female connector 2, as can be seen in the enlargement of FIG. 4C. In this particular configuration, the branches 15 tend to twist under the effect of the mechanical interference of the male connector 6 against the connection element 10.

Figures 5A, 6A:
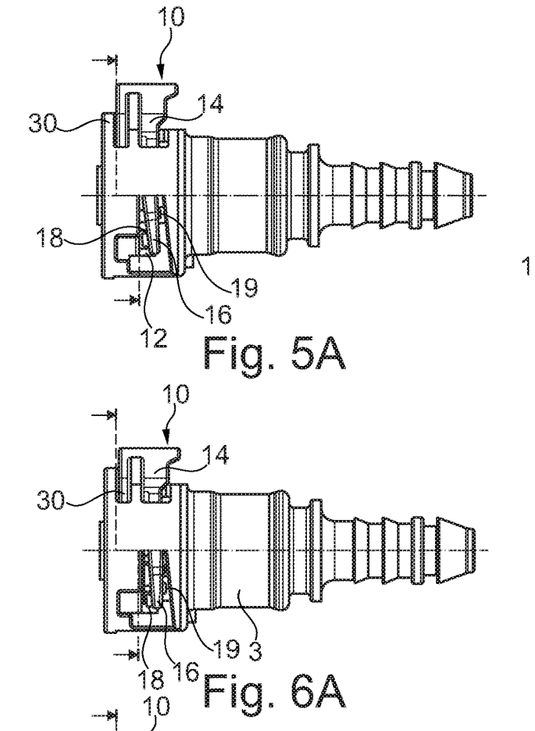
FIGS. 5A and 5B are respectively a profile view and an end view in two different cross-section planes of the tube coupling in a second mechanical interference state with the male connector.
FIGS. 6A and 6B are respectively a profile view and an end view in two cross-section planes showing the tube coupling in a first intermediate state while lowering the connection element into the female connector.
Figures 5B, 6B:
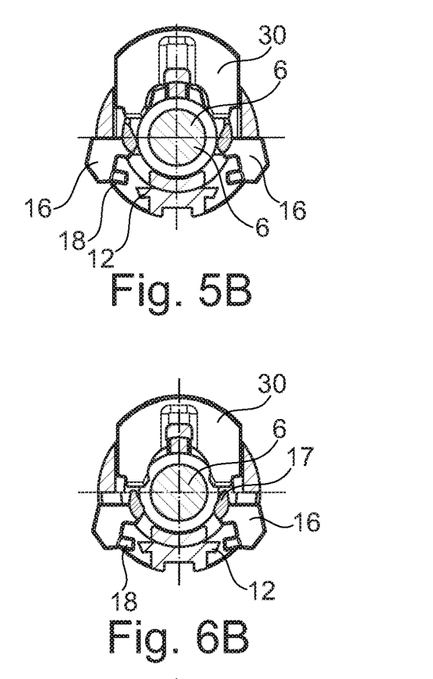

As can be seen in FIGS. 5A and 5B, the male connector 6 is pushed in a little more into the female connector 2. The collar 7 continues to exert axial pressure against the feelers 17, but the branches 15 are in abutment against the body 3 of the female connector 2 so they now move apart radially and reach a maximum distance apart as can be seen in FIG. 5B. In this spaced-apart configuration of the flexible branches 15, it can be clearly be seen in FIG. 5B that the hooks 16 lie beyond the locking catches 12, and during downward transverse movement of the connection element 10 into the female connector 2, the hooks 16 go round the locking catches 12 in the clearance zone 11 of the female connector 2 (in a manner described below).

By pushing the male connector 6 further into the female connector 2, the collar 7 loses contact with the feelers 17 of the connection element 10, with the branches 15 retracting by sliding diametrically over the rear face of the collar 7. The collar 7 becomes blocked behind the branches of the lock 30 and it is held between the retracted flexible branches 15.

Figure 7A:
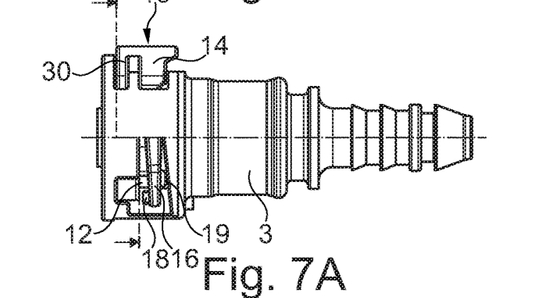
FIGS. 7A and 7B are respectively a profile view and an end view in two cross-section planes showing the tube coupling in a second intermediate state while lowering the connection element into the female connector.
Figure 7B:
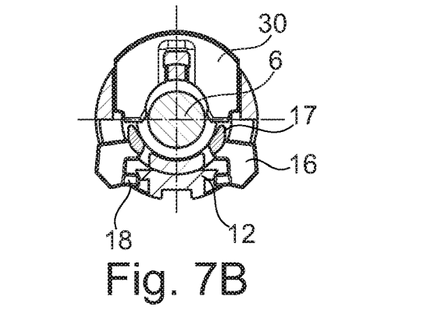

When the flexible branches 15 retract elastically, they move radially towards each other, while also retracting axially in the direction opposite to the direction for inserting the connection element 10, so as to return to their initial rest position. These two retraction movements generate a thrust force on the connection element 10 so that the connection element 10 moves transversely of its own accord in the recess 8 towards the inside of the female connector 2, as shown in FIGS. 6 and 7, until it reaches a low, retention and locking position in the female connector 2. In order to go round the catches 12 as mentioned above, it must be understood that the hooks 16 perform a first movement by axial projection and are then subjected to being spaced apart radially. When the male connector 6 is fully pushed into the female connector 2, the hooks 16 return to a rest position in an axial direction, such that the hooks 16 become engaged radially against the sides of the catches 12 and they become held by moving radially under the catches 12, with the retaining fingers 18 being received under the shoulders 112.

Figure 8A:
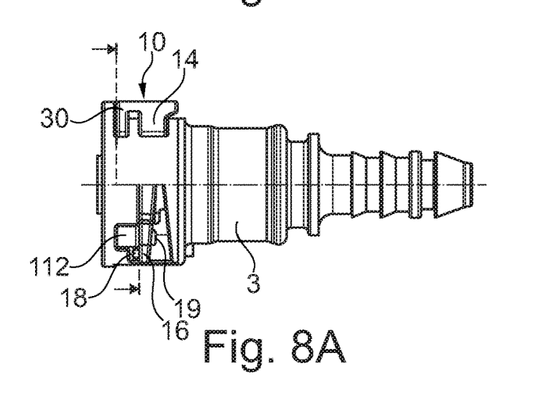
FIGS. 8A and 8B are respectively a profile view and an end view in two cross-section planes showing the connected tube coupling.
Figure 8B:
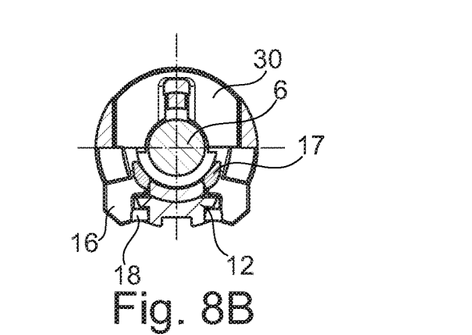

The low position of the connection element 10 is shown in FIGS. 8A and 8B. In this low position, it can be seen that the catches 12 are received in the C-shape of the hooks 16. In this position, the connection element 10 can no longer move upwards transversely in the body 3 of the female connector 2. The male connector 6 is blocked axially in the female connector 2. As a result of this arrangement, the tube coupling 1 is completely safe.

Furthermore, in this low, retaining position, the top of the connection element 10 (i.e. the bases of the U-shapes of the two forks) lie flush with the outside surface (the top surface in the drawing) of the female connector 2.

It can be understood that the mechanism for moving the connection element 10 transversely is totally internal within the female connector 2, thereby enabling the overall size of the tube coupling 1 to be reduced.

It is also possible to provide a visual indicator in the tube coupling 1 in order to verify that the male connector 6 has been pushed fully into the female connector 2, with this being provided in the form of a mark on the connection element 10 that becomes covered and thus masked when it is inserted in the female connector 2.

The connection element 10 in the automatically-connecting safe tube coupling 1 can be adapted to male connectors 6 having different shapes or different diameters, and also to collars 7 having different radii.

The tube coupling 1 has few separate parts and they can all be made out of plastics material, e.g. by injection molding or by 3D printing.

Figures 9A, 10A:
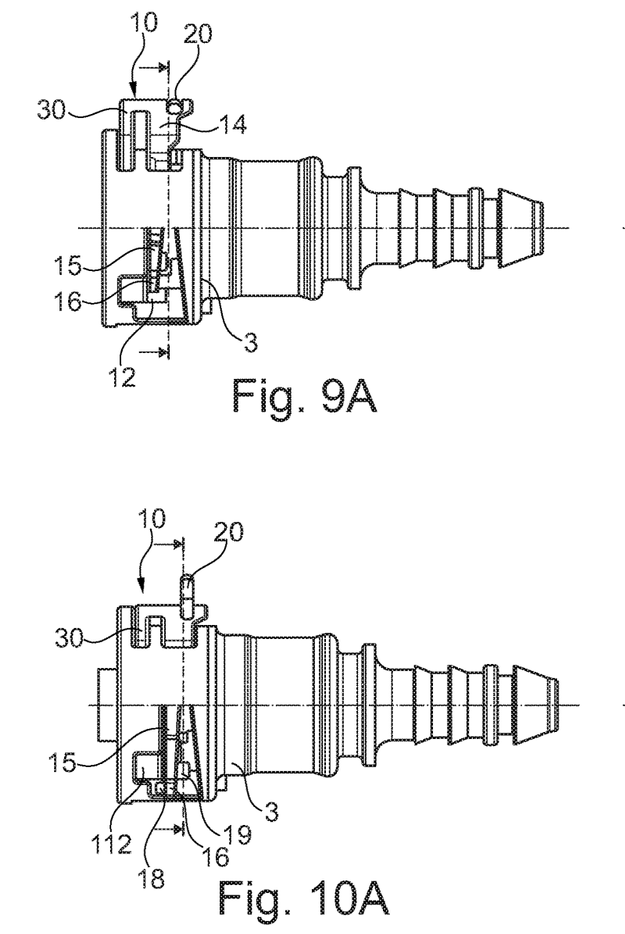
FIGS. 9A and 9B are respectively a profile view and an end view in cross-section of the tube coupling in a pre-assembly position in a particular embodiment having a clip as an indicator of proper assembly.
FIGS. 10A and 10B are respectively a profile view and an end view in cross-section view of the connected tube coupling showing the clip in a high position in a particular embodiment.

In a variant embodiment, as shown in FIGS. 9A to 11A, provision may be made in the tube coupling 1 for a clip 20 that acts as an indicator showing two stages of assembling the coupling. In FIGS. 9A and 9B, the connection element 10 is in its high, pre-assembly position. When the male connector 6 is properly inserted in the female connector 2, the clip 20 projects from the coupling, i.e. it is in a high position, as can be seen in FIGS. 10A and 10B, thus making it possible for an operator to perform first visual and/or tactile verification that the coupling is properly assembled.

Figure 11A:
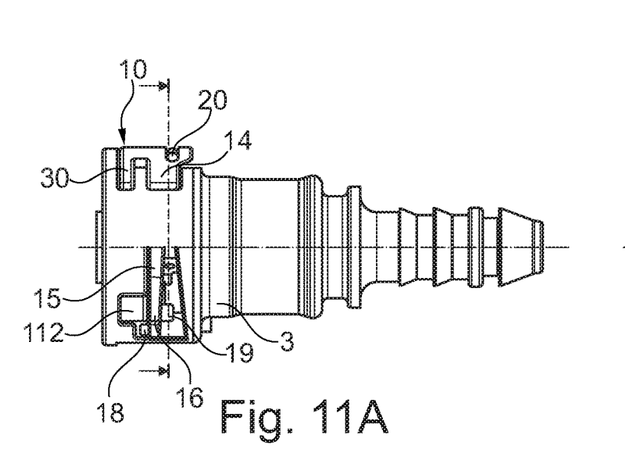
FIGS. 11A and 11B are respectively a profile view and an end view in cross-section of the connected tube coupling in a low position in a particular embodiment.
Figure 11B:
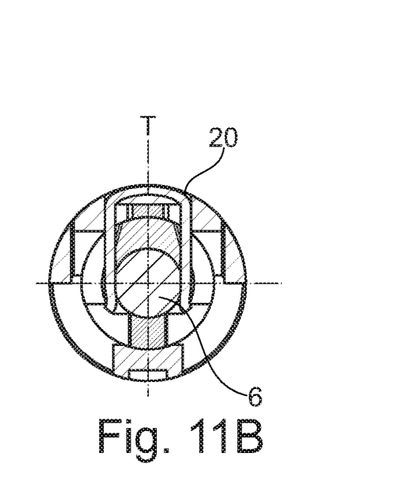

Thereafter, a second verification is performed by a second operator who in turn observes that the clip 20 is in a projecting position and who pushes it manually into the coupling so that it is no longer in a projecting position, i.e. so that it is in a low position, as can be seen in FIGS. 11A and 11B.

This two-stage verification makes it possible to observe that the coupling is properly assembled and thereby limits assembly errors on an assembly line.

In this example, the clip 20 is in the form of a fork made up of two substantially flexible and parallel tines, as can be seen in FIGS. 9A to 11B.

Figures 9B, 10B:
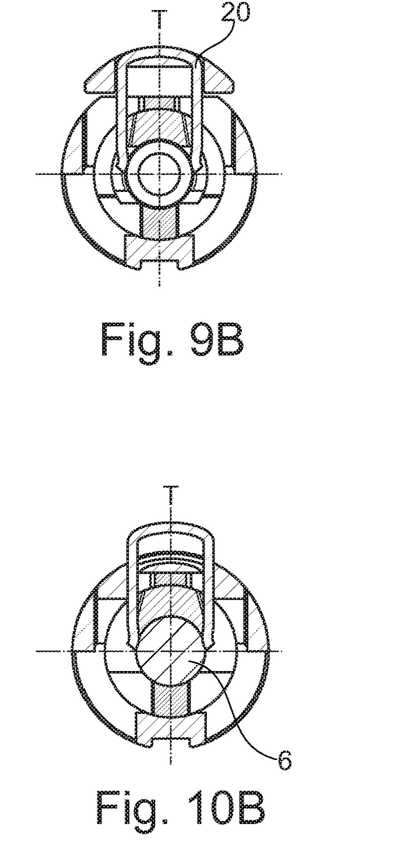

The tines of the clip 20 are designed to be inserted in respective grooves of the connection element 10 provided for this purpose in the transverse direction T shown in FIG. 9B and prior to inserting the male connector 6.

Once the flexible tines of the clip 20 have been inserted, they exert a pressure force on the inside profile of the female connector 2 presenting unintentional withdrawal of the clip 20.

It can also be understood that while inserting the male connector 6 into the female connector 2, the connection element 10 moves transversely towards the inside of the female connector 2 in order to lock the male connector 6, while the clip 20 remains in the high position, projecting from the coupling. Once the male connector 6 is correctly inserted, the ends of the tines of the clip 20 are positioned on the male connector 6 and prevent the clip 20 from moving down into its low position without additional thrust force being exerted.

It should be observed that the mechanism for lowering the connection element 10 does not interact with the mechanism for lowering the clip 20, since the clip 20 is arranged to be pushed into its low position manually by an operator.

The invention claimed is:

1. A tube coupling, comprising:
a female connector having a body defining an orifice,
a male connector having an annular collar which is designed to be inserted into the orifice of the female connector along an axial direction, and
a connection element that, when inserted into said body of said female connector, extends along a transverse direction in a recess in said body of said female connector and that is deformed elastically radially towards an outside of said female connector by mechanical interference with said collar during said insertion of said male connector into said female connector and, in reaction to said radial elastic deformation, springs back along said transverse direction towards the inside of said female connector, said connection element comprising at least one locking hook, the at least one locking hook closing on at least one locking catch provided in said body of said female connector in a locking position when said connection element is fully inserted into said body of said female connector,
wherein said connection element and said body of said female connector have a first position wherein said at least one locking hook is above said at least one locking catch in said transverse direction and initially projected axially into said body of said female connector, an intermediate position wherein said connection element is axially, radially and elastically deformed and said at least one locking hook is, in the transverse direction, at a same level as said at least one locking catch, and a closure position wherein a part of said at least one locking hook is placed below said at least one locking catch in the transverse direction so as to prevent an upwards displacement of said at least one locking hook in said transverse direction,
wherein the tube coupling is arranged so that said connection element and said body of said female connector achieve said first position before said intermediate position, and said connection element and said body of said female connector achieve said intermediate position before said closure position when said male connector is inserted into said female connector.

2. A coupling according to claim 1, wherein said connection element is in the form of two forks, with a first U-shaped fork forming a lock for said collar and a second U-shaped fork forming a yoke, said forks being connected together at bases of the U-shapes, said second U-shaped fork having two branches, each branch provided with one of said at least one locking hook extending in the transverse direction and with an opening facing radially towards an inside of the orifice in the body of the female connector.

3. A coupling according to claim 2, wherein before said connection element and said body of said female connector achieve said intermediate position, said opening of each of said at least one locking hook is located above a respective locking catch of said at least one locking catch, and in said closure position, each of said at least one locking catch forms an abutment for each of said at least one locking hook, and in said recess of said body of said female connector each of said at least one locking catch is arranged in a clearance zone configured so that each locking hook can move axially therein.

4. A coupling according to claim 3, wherein each of said at least one locking hook of said connection element is provided with a retaining finger that prevents said connection element from moving transversely in said clearance zone inside said recess of said female connector.

5. A coupling according to claim 2, wherein a front interference face of each branch is formed by an oblique surface that slopes relative to said axial direction and that is arranged below a middle of said axial orifice of said female connector in order to interfere with said collar of said male connector.

6. A coupling according to claim 3, wherein each branch of said connection element has a back face opposite from an interference front face, which back face is provided with a peg whereby said connection element bears against said body of said female connector in order to force said branch to twist under an effect of said mechanical interference of said male connector against said connection element.

7. A coupling according to claim 1, wherein when said connection element is fully inserted into said recess of said female connector, said connection element is flush with an outside surface of said body of said female connector, and in this position said connection element masks a visual indicator for verifying proper assembly that is applied to said connection element.

8. A coupling according claim 1, further comprising a clip designed to be inserted in said connection element when said connection element is fully inserted in said body of said female connector, said clip serving as an indicator for verifying that said coupling is properly assembled.

9. A coupling according claim 1, wherein said connection element moves automatically inside said female connector.

* * * * *